March 30, 1948.
W. H. NEWELL ET AL
2,438,818
TRIANGLE SOLVER
Filed Oct. 5, 1945
4 Sheets-Sheet 1
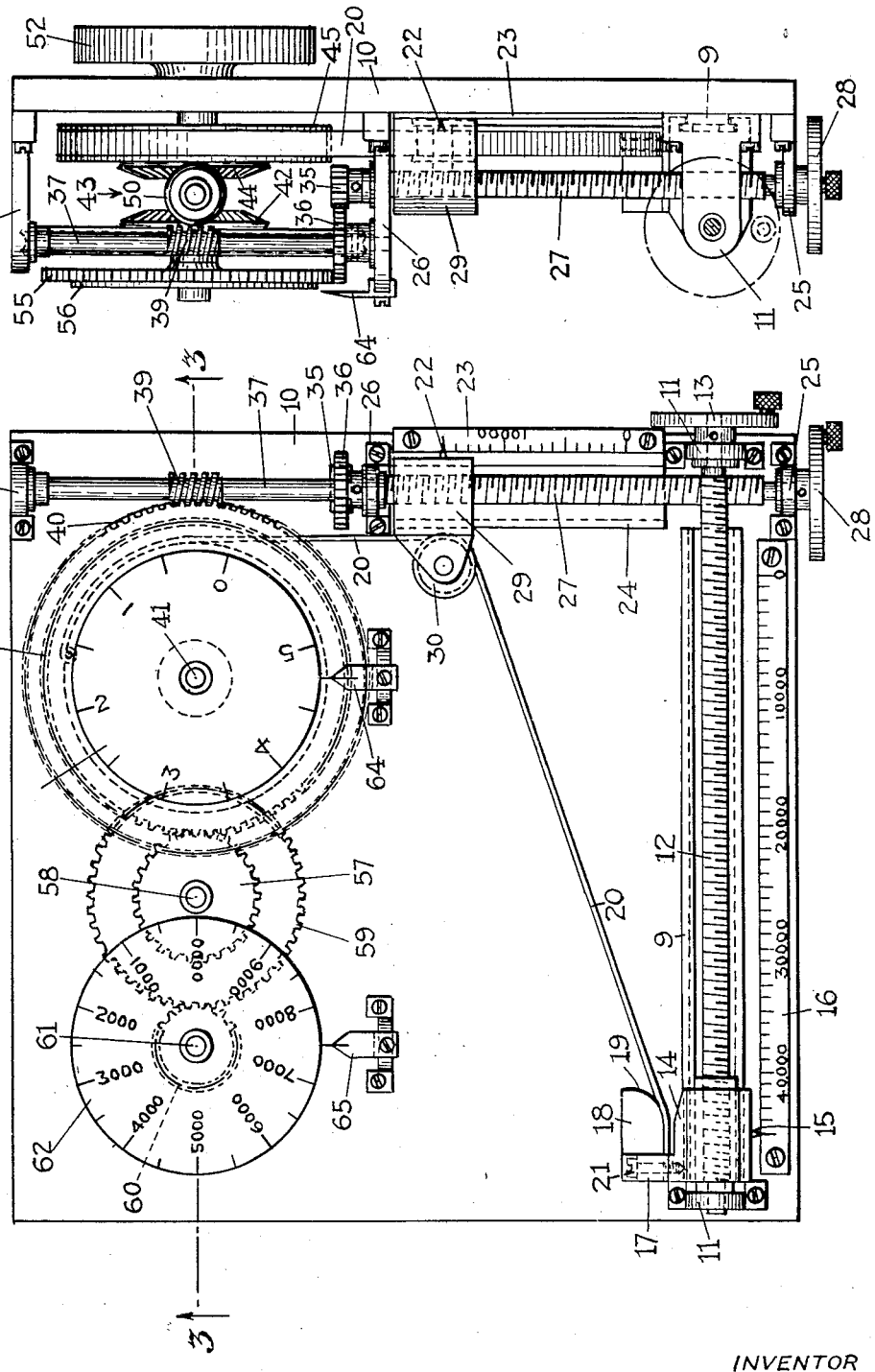
INVENTOR
WILLIAM H. NEWELL
LAWRENCE S. BROWN
ATTORNEY

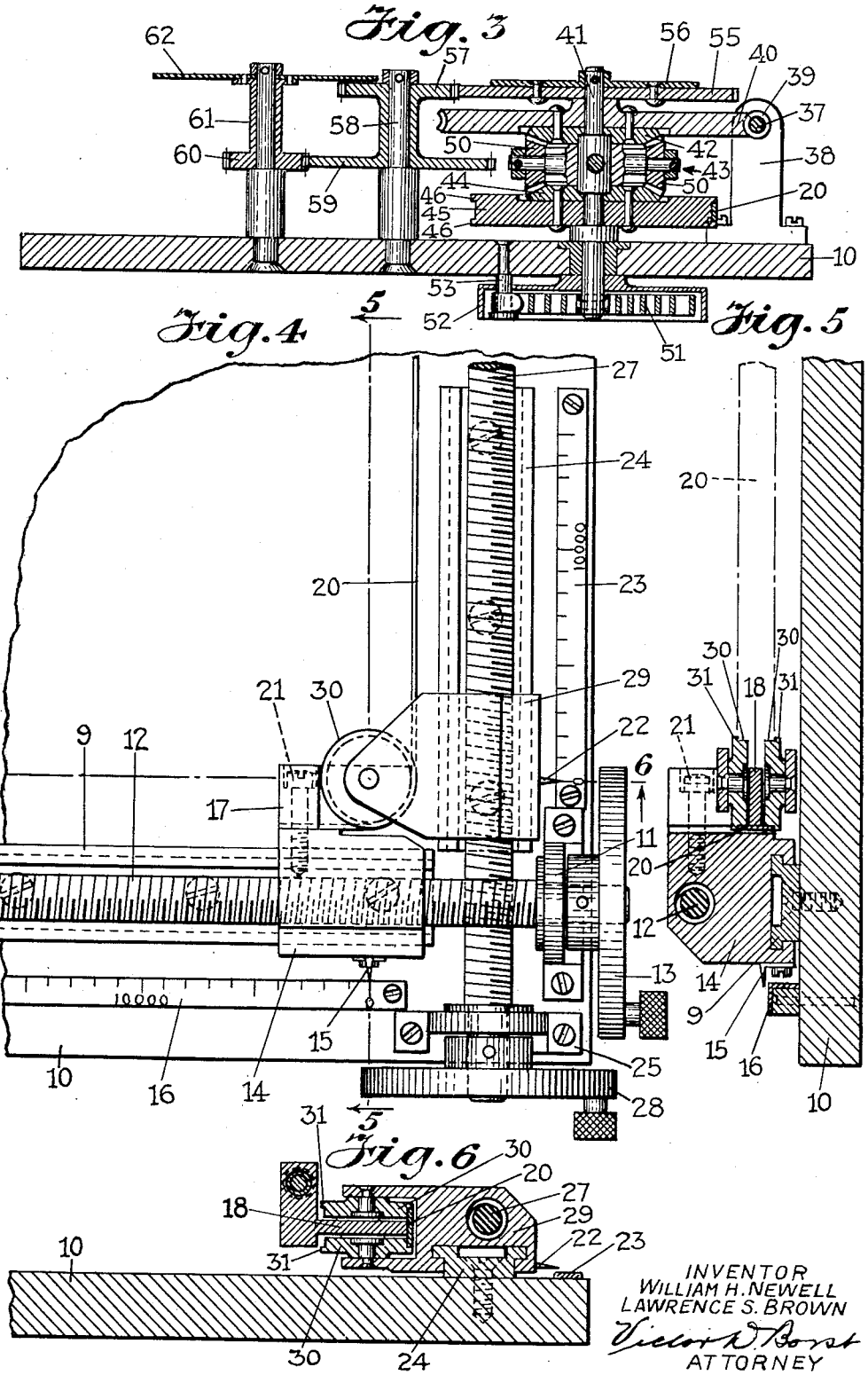

March 30, 1948. W. H. NEWELL ET AL 2,438,818
TRIANGLE SOLVER
Filed Oct. 5, 1945 4 Sheets-Sheet 3

INVENTOR
WILLIAM H. NEWELL
LAWRENCE S. BROWN
ATTORNEY

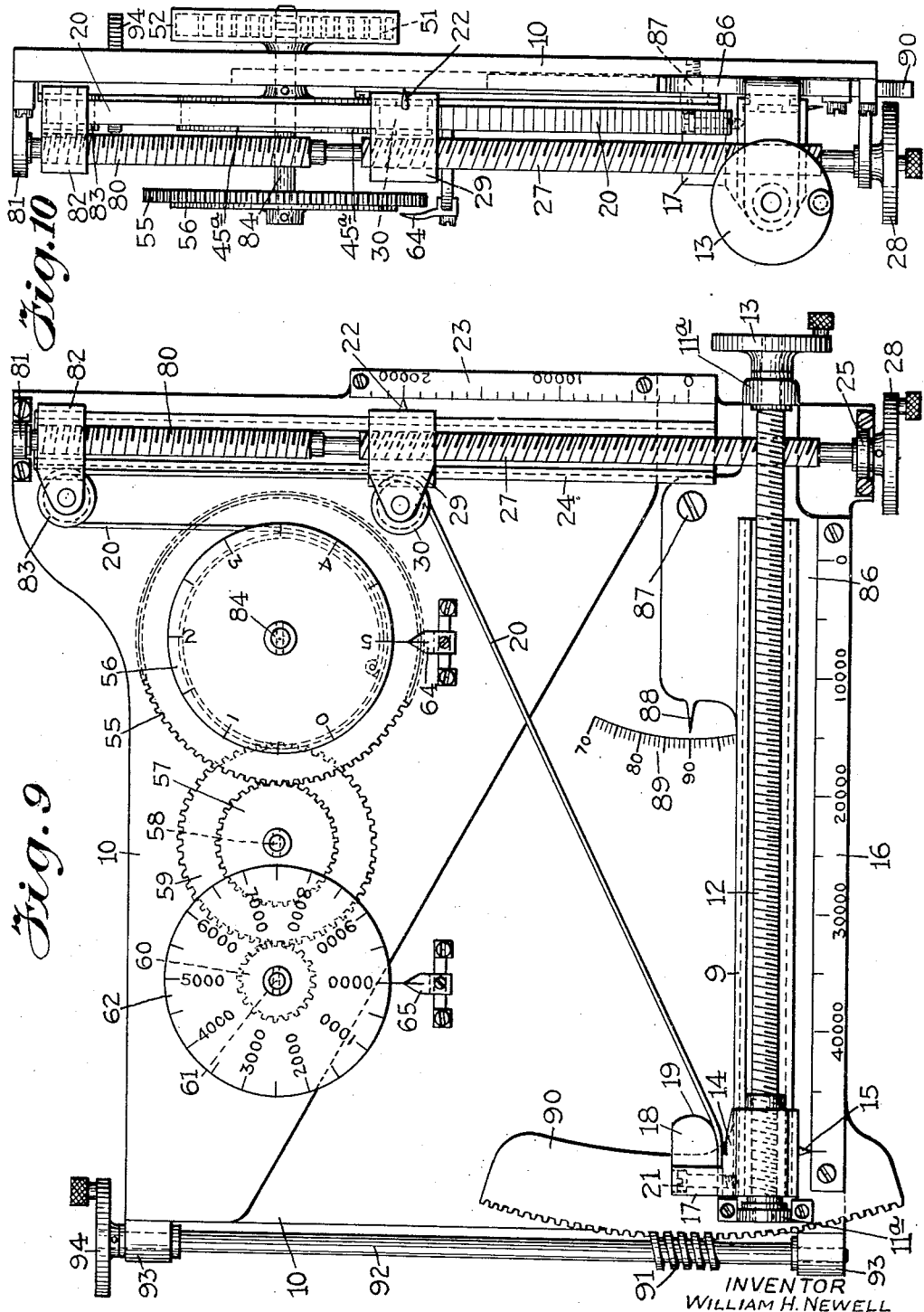

Patented Mar. 30, 1948

2,438,818

UNITED STATES PATENT OFFICE 2,438,818

TRIANGLE SOLVER

William H. Newell, New York, and Lawrence S. Brown, Long Island City, N. Y., assignors to Ford Instrument Company, Inc., Long Island City, N. Y., a corporation of New York Application October 5, 1945, Serial No. 620,484

10 Claims. (Cl. 235—61)

This invention relates to computing apparatus and more particularly to an apparatus for computing an element of a triangle having three known elements.

The invention is applicable to range computing purposes and is particularly adapted to compute the horizontal range between an airplane and a point on the ground when the slant or direct range and height or altitude are known, although the apparatus is capable of various other uses.

An object of the invention is to provide an accurate and dependable apparatus of the type above indicated.

Another object is to provide an apparatus of the above type for automatically setting a shaft in accordance with the computed element.

Various other objects and advantages will be apparent as the nature of the invention is more fully disclosed.

In one embodiment of the present invention, the length of one side of a triangle is measured by means of a tape which is mounted to extend between two carriages movable respectively along the other two sides of the triangle. The carriages are adjustable in accordance with scales arranged to indicate the length of the respective sides. The angle between the two sides may also be adjustable. The tape is fed from a spring biased drum mounted for rotation about a fixed axis and connected to actuate a scale to indicate the length of the side of the triangle represented by the tape. In one embodiment means is provided to maintain the tape under substantially constant tension so as to eliminate any errors due to the stress of the tape.

The details of construction and the manner of operation will be better understood from the following description, taken in connection with the accompanying drawings in which specific embodiments of the invention have been set forth for purposes of illustration.

In the drawings:

Fig. 1 is a side elevation of a computing device embodying the present invention;

Fig. 2 is an end elevation thereof;

Fig. 3 is a section taken on the line 3—3 of Fig. 1;

Fig. 4 is a detail view of a portion of the apparatus showing the carriages in zero position;

Figure 7:
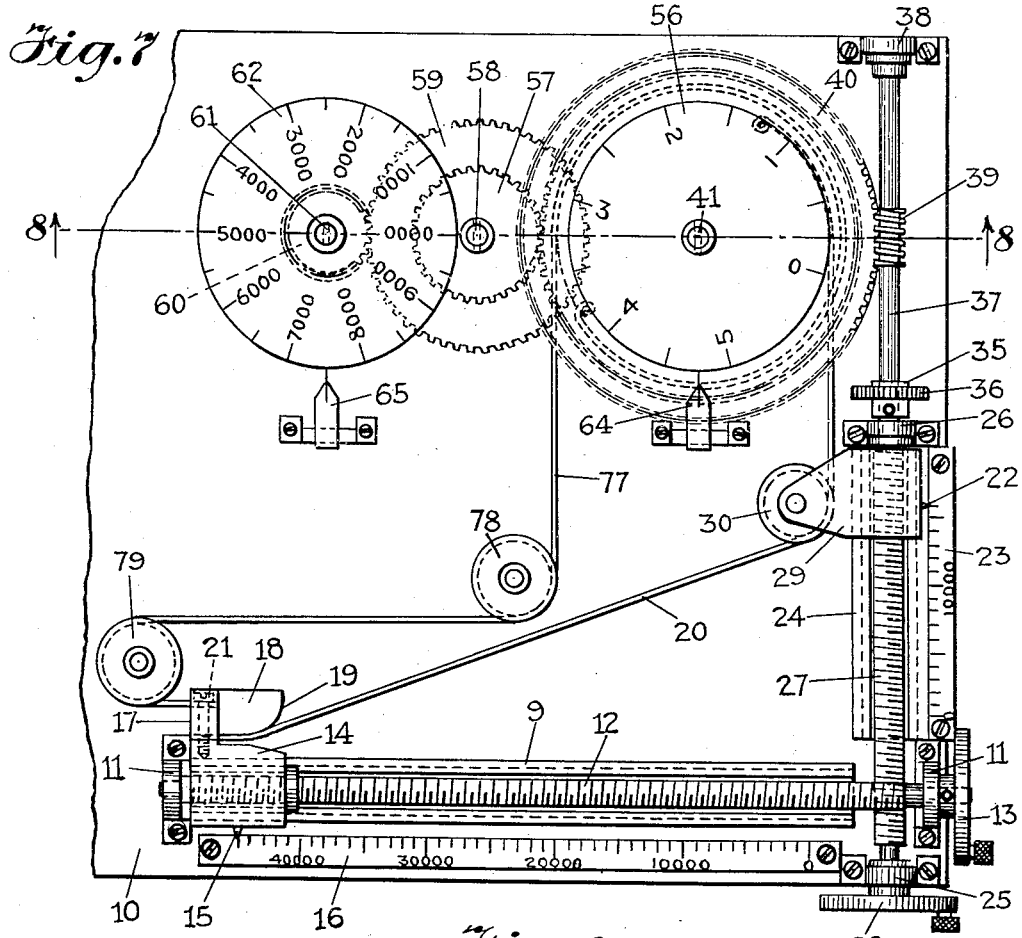
Figure 8:
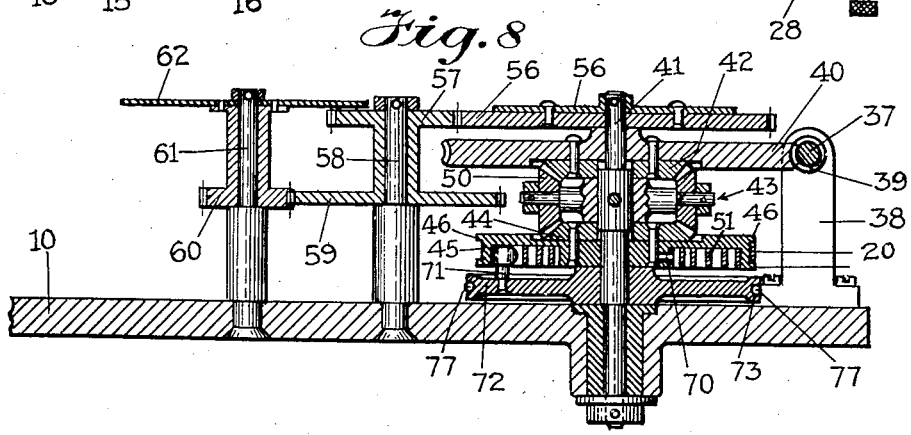

Figs. 5 and 6 are sections taken on the lines 5—5 and 6—6 respectively of Fig. 4;

Fig. 7 is a side elevation of an apparatus illustrating a further embodiment of the invention;

Fig. 8 is a section taken along the line 8—8 of Fig. 7;

Fig. 9 is a side elevation of an apparatus illustrating still a further embodiment of the invention; and Fig. 10 is an end elevation of the apparatus of Fig. 9.

Referring first to the embodiment of Figs. 1 to 6, the apparatus is shown as applied to an apparatus for computing the slant range when the horizontal range and height of a plane are known. The device comprises a base 10 carrying a pair of brackets 11 in which a threaded horizontal range shaft 12 is journaled. The range shaft 12 is actuated by a hand wheel 13. Threaded on the range shaft 12 is a carriage 14 which is adapted to feed along a guide member 9 as the range shaft is rotated. The carriage 14 carries a pointer 15 which registers with a scale 16 graduated in suitable units, for example, yards of horizontal range. The carriage 14 carries a bracket 17 having a tape guiding extension 18 secured thereto. The extension 18 is provided with an arcuate surface 19 about which a tape 20 passes. The end of the tape 20 is clamped between the carriage 14 and the bracket 17 by means of the screw 21. The tape 20 preferably is of metal.

The base 10 also carries brackets 25 and 26 in which a threaded shaft 27 is journaled. The shaft 27 extends at a right angle to the shaft 12 and is actuated by a hand wheel 28. A carriage 29 is mounted to feed along a guide member 24 due to the rotation of shaft 27. The carriage 29 carries a pointer 22 which registers with a scale 23 graduated for example to represent height or altitude. The carriage 29 also carries a pair of rollers 30 about which the tape 20 extends. The rollers 30 are spaced to receive the extension 18 therebetween when the two carriages are in zero position as shown in Figs. 4, 5 and 6, and are provided with flanges 31 which guide the tape 20 as it passes therearound.

The altitude shaft 27 carries a pinion 35 engaging a gear 36 mounted on a worm shaft 37. The shaft 37 is journaled in brackets 26 and 38 and carries a worm 39 meshing with a worm gear 40.

The worm gear 40 is journaled to rotate about a shaft 41 (Fig. 3) and carries a beveled gear 42 forming a part of a differential 43. The opposing part of the differential 43 comprises a beveled gear 44 which is attached to a drum 45 likewise journaled for rotation about the shaft 41. The drum 45 is provided with flanges 46 for positioning the tape 20. The tape 20 passes part way around the drum 45 and one end of the tape is secured thereto. The shaft 41 carries pinions 50 which mesh with the beveled gears 42 and 44 of the differential and is journaled for rotation in the base 10. One end of the shaft 41 is attached to one end of a spiral spring 51 which is enclosed in a casing 52 and is anchored at its other end by a pin 53 to the base 10. The spring 51 is adapted to hold the tape 20 under suitable tension. The shaft 41 also carries a gear 55 and a dial 56. The gear 55 meshes with a pinion 57 journaled upon a pin 58 carried by the base 10 and is connected with a gear 59. The gear 59 drives a pinion 60 which is journaled for rotation upon a pin 61 carried by the base 10 and drives a dial 62. The arrangement is preferably such that the dial 62 makes ten revolutions to each revolution of the dial 56. The dial 62 may be graduated to indicate for example thousands of yards and the dial 56 may be graduated to indicate ten thousands of yards. Stationary pointers 64 and 65 (Fig. 1) are mounted on the base 10 to register with the dials 56 and 62 respectively.

The operation of this device may be best understood by referring first to the position shown in Fig. 4, wherein the horizontal range carriage 14 and height carriage 29 are in zero position at which the axis of the rollers 30 registers with the center of the arcuate surface 19. In this position the dials 56 and 62 should indicate zero and the pointers 15 and 22 should register with the zero marking on the scales 16 and 23. If now the height carriage 29 is moved upwardly by suitable actuation of the hand wheel 28 while the range carriage 14 remains in its zero position, there will be no movement of the tape 20. However, the movement of the shaft 27, through the worm 39 and worm gear 40 drives one side of the differential 43 and thereby causes the dials 56 and 62 to advance. The gear ratio should be such that the position indicated by the scales on the dials 56 and 62 corresponds to the position of the height carriage 29 as indicated on the scale 23.

If now the horizontal range carriage 14 is shifted to the left by actuation of the hand wheel 13, the tape 20 will feed around the rollers 30 from the drum 45 to the position indicated in Fig. 1. This movement of the tape from the drum 45 actuates the other side of the differential and causes a further movement of the dials 56 and 62 which thus measure the amount of the tape withdrawn from the drum 45. The amount of tape thus drawn from the drum 45 plus the movement of the height carriage 29 constitutes a measure of the length of the tape between its point of contact with the arcuate surface 19 and rollers 30 which in the embodiment shown is the hypotenuse of the triangle formed by the horizontal range and height legs and therefore represents the slant range. It is evident of course that the shaft 41 may be connected to actuate a mechanism of any desired type and when so connected will set the slant or direct range into the mechanism automatically. It is to be understood of course, that if the slant range and height are known the height carriage 29 will be set in accordance with the height and the horizontal range carriage 14 will then be positioned by hand wheel 13 until the dials 56 and 62 read in accordance with the slant range. The horizontal range may then be read on the scale 16. It is evident that other problems may be solved and that guide members 9 and 24 and the shafts 12 and 27 may be located at other than a right angle in accordance with the particular problem.

In the embodiment shown in Figs. 7 and 8 the parts which are similar to those above described are given corresponding reference characters. This embodiment differs from that of Figs. 1 to 6 in that the spring 51 is mounted within the drum 45. The inner end of the spring is attached by a pin 70 to the hub of the drum 45 and the outer end of the spring is secured to a pin 71 which is mounted in a pulley 72. The pulley 72 is journaled for rotation about the shaft 41 and is provided at its periphery with a groove 73 in which a cord 77 is seated. One end of the cord 77 is secured to the pulley 72 and the other end of the cord 77 passes around idler pulleys 78 and 79 and is attached to the brackets 17 so that the pulley 72 rotates substantially with the drum 45 except for the difference in movement of the tape 20 and the cord 77 caused by the height adjustment. Hence the spring 51 remains under substantially constant tension throughout and substantially constant tension is therefore applied to the tape 20.

This embodiment provides extreme accuracy inasmuch as the effect of changes in length of the tape 20 due to variations in tension is substantially eliminated.

The embodiment shown in Figs. 9 and 10 is likewise similar to that described above and similar parts have been given corresponding reference characters. In this embodiment, however, the differential is eliminated and other compensating means is provided. Also the angle between the arms is shown as adjustable.

In the embodiment of Figs. 9 and 10 the shaft 27 is extended to include a threaded portion 80 which is journaled at its outer end in a bracket 81. The threaded portion 80 positions a carriage 82 which is provided with a flanged roller 83 over which the tape 20 extends in passing from the rollers 30 to a drum 45a mounted on a shaft 84. The dial 56 is mounted directly upon the shaft 84 of the drum 45a. The inner end of the spring 51 is attached to this shaft. The threads of the portion 80 have one-half the pitch of the threads of the main part of the shaft 27 so that the carriage 82 moves one-half of the distance of the carriage 29. This arrangement of the tape 20 passing around the roller 83 acts as a differential so that the dials 56 and 62 are moved an amount representing the movement of the carriage 29 from its zero position. Hence the total movement of the dials 56 and 62 represents the amount of the tape 20 between the arcuate surface 19 and the pulleys 30 as above described.

In Fig. 9 the guide member 9 and the shaft 12 are made adjustable in angle. For this purpose the guide member 9 and the brackets 11a carrying the shaft 12 are mounted on an arm 86 which is pivoted to the base 10 by a screw 87 at the locus of the center of the arcuate surface 19 and the axis of the rollers 30 when they are in zero position (Fig. 4). The arm 86 carries the scale 16, a pointer 88 registering with a scale 89 on the base 10 and an arcuate toothed segment 90. The segment 90 is actuated by a worm 91 on a shaft 92 which is journaled in brackets 93 on the base 10 and is provided with a hand adjusting wheel 94.

In the position shown the shaft 12 on the arm 86 is set for a 90° angle relative to the shaft 27. The position of shaft 12 may be adjusted by the hand wheel 94 to an angular position relative to the shaft 27 as indicated by the scale 89. The operation is otherwise similar to that above described.

This arrangement may be used to solve for any one of the elements represented by the three sides and one angle of the triangle when the other three elements are known. When the apparatus is set so that the three known elements are read on the corresponding scales the reading of the fourth scale will represent the unknown element.

Obviously the embodiments of Figs. 1 to 8 may be provided with means to adjust the angle as set forth in Figs. 9 and 10. This feature has been omitted in Figs. 1 to 8 for clarity.

Although specific embodiments of the invention have been shown for purposes of illustration, it is to be understood that the invention is not to be restricted thereto but is capable of various uses and adaptations as will be readily apparent to a person skilled in the art. The invention is only to be restricted in accordance with the scope of the following claims.

What is claimed is:

1. Apparatus for computing one element of a triangle having three elements of known value, comprising guide members positioned along two sides of said triangle, a pair of carriages movable along the respective guide members, means positioning said carriages along the respective members, a drum mounted to rotate about a fixed axis, a tape guide carried by the first of said carriages, a tape passing around said guide and having one end secured to the second carriage and its other end secured to and wound onto said drum, means biasing said drum to hold said tape under tension whereby the drum is rotated by the movement of said tape, means positioned by said drum, and means responsive to movement of the first carriage to modify the position of said last means so that the positioned means represents the length of tape between said carriages.

2. Apparatus for computing third side of a triangle having two sides of known length and a known intercepted angle, comprising a pair of carriages, threaded shafts extending along said known sides and arranged to feed said carriages therealong, a drum mounted to rotate about a fixed axis, a tape guide carried by the first of said carriages, a tape passing around said guide and having one end secured to the second carriage and its other end secured to and wound onto said drum, spring means biasing said drum to hold said tape under tension whereby the drum is rotated by the movement of said tape due to movement of said carriages, a differential having a pair of input elements and an output element, means connecting one of said input elements to rotate with said drum, gear means connected to the threaded shaft driving said first carriage and connected to drive said other input element by an amount representing the movement of said first carriage, and means driven by said output element as a measure of the length of tape between said carriages.

3. Apparatus for computing one element of a triangle having three elements of known value, comprising guide members positioned along two sides of said triangle, a pair of carriages movable along the respective guide members, means positioning said carriages along the respective members, a drum mounted to rotate about a fixed axis, a tape guide carried by the first of said carriages, a tape passing around said guide and having one end secured to the second carriage and its other end secured to and wound onto said drum, means biasing said drum to hold said tape under tension whereby the drum is rotated by the movement of said tape, a differential comprising a pair of input elements and an output element, means rotating one of said input elements with said drum, an output shaft driven by said output element, and means connecting said first mentioned carriage to drive said other input element by an amount representing the movement of the first mentioned carriage whereby the movement of said output element is a measure of the length of the tape between the said carriages.

4. Apparatus for computing one element of a triangle having three elements of known value, comprising guide members positioned along two sides of said triangle, a pair of carriages movable along the respective guide members, means positioning said carriages along the respective members, a drum mounted to rotate about a fixed axis, a pair of tape guides carried by said pair of carriages respectively, said tape guides being arranged to interleave when both said carriages are in zero position, a tape passing around the guide of said first carriage and having one end secured to the guide of said second carriage and its other end secured to and wound onto said drum, means biasing said drum to hold said tape under tension whereby the drum is rotated by the movement of said tape due to movement of said carriages, means positioned by said drum, and means responsive to movement of the first carriage to modify the position of said last means as a function of said movement so that the positioned means represents the length of the tape between its point of engagement with the guides of said carriages.

5. A range computing mechanism comprising a horizontal range shaft and a height shaft, a pair of carriages arranged to be fed along said shafts respectively, a drum mounted to rotate about a stationary axis, a tape guide mounted on the first of said carriages, a tape having one end secured to the second carriage, said tape passing around said guide and having its other end wound onto and secured to said drum, spring means biasing said drum to maintain said tape under tension, a differential having input elements driven by the shaft actuating said first carriage and by said drum respectively and having an output element driven as a function of the movement of said carriages to represent the length of tape extending therebetween.

6. A range computing mechanism comprising a horizontal range shaft and a height shaft, a pair of carriages arranged to be fed along said shafts respectively, a drum mounted to rotate about a stationary axis, a tape guide mounted on the first of said carriages, a tape having one end secured to the second carriage, said tape passing around said guide and having its other end wound onto and secured to said drum, spring means biasing said drum to maintain said tape under tension, a tape guide carried by said second carriage, means interleaving said tape guides when said carriages are both in zero position, a differential having input elements driven by the shaft actuating said first carriage and by said drum respectively and having an output element driven as a function of the movement of said carriages to represent the length of tape extending therebetween.

7. Apparatus for computing one element of a triangle having three elements of known value, comprising guide members positioned along two sides of said triangle, a pair of carriages movable along the respective members, means feeding said carriages along the respective members, a drum mounted to rotate about a fixed axis, a tape guide carried by the first of said carriages, a tape passing around said guide and having one end secured to the second carriage and its other end secured to and wound onto said drum, means biasing said drum to hold said tape under tension whereby the drum is rotated by the movement of said tape due to movement of said carriages, means positioned by said drum, means responsive to movement of the first carriage to modify the position of said last means so that the positioned means represents the length of tape between said carriages, and means actuated with said second carriage to maintain said biasing means under substantially constant tension.

8. Apparatus for computing one element of a triangle having three elements of known value, comprising guide members positioned along two sides of said triangle, a pair of carriages movable along said guide members, means feeding said carriages along the respective members, a drum mounted to rotate about a fixed axis, a tape guide carried by the first of said carriages, a tape passing around said guide and having one end secured to the second carriage and its other end secured to and wound onto said drum, spring means biasing said drum to hold said tape under tension whereby the drum is rotated by the movement of said tape due to movement of said carriages, means positioned by said drum, means responsive to movement of the first carriage to modify the position of said last means so that the positioned means represents the length of tape between said carriages, a pulley mounted to rotate about the axis of said drum and carrying said spring means, and a cord wound around said pulley and having its free end attached to said second carriage for movement therewith in a direction to maintain substantially constant spring tension on said drum as the tape is fed therefrom.

9. Apparatus for computing one element of a triangle having three elements of known value, comprising guide members positioned along two sides of said triangle, a pair of carriages movable along said guide members, means feeding said carriages along the respective members, a drum mounted to rotate about a fixed axis, a tape guide carried by the first of said carriages, a tape passing around said guide and having one end secured to the second carriage and its other end secured to and wound onto said drum, means biasing said drum to hold said tape under tension whereby the drum is rotated by the movement of said tape due to movement of said carriages, a third carriage movable with said first carriage but at one-half of the rate thereof, a pulley carried by said third carriage, said tape passing around said last pulley on its way to said drum whereby movement of said carriages actuates said drum as a function of the distance between the first and second carriages.

10. Apparatus for computing one element of a triangle having three elements of known value, comprising guide members positioned along two sides of said triangle, a pair of carriages movable along said guide members, means feeding said carriages along the respective members, a drum mounted to rotate about a fixed axis, a tape guide carried by the first of said carriages, a tape passing around said guide and having one end secured to the second carriage and its other end secured to and wound onto said drum, means biasing said drum to hold said tape under tension whereby the drum is rotated by the movement of said tape due to movement of said carriages, means adjusting the angle between said side members to conform to the corresponding angle of the triangle, means positioned by said drum, and means responsive to movement of the first carriage to modify the position of said last means so that the positioned means represents the length of tape between said carriages.

WILLIAM H. NEWELL.
LAWRENCE S. BROWN.

REFERENCES CITED

The following references are of record in the file of this patent:

UNITED STATES PATENTS

| Number | Name | Date |
| --- | --- | --- |
| 1,282,553 | Eaton, Jr. | Oct. 22, 1918 |
| 1,998,711 | Du Bois | Apr. 23, 1935 |

FOREIGN PATENTS

| Number | Country | Date |
| --- | --- | --- |
| 558,685 | Great Britain | Jan. 17, 1944 |